United States Patent Office 3,057,595
Patented Oct. 9, 1962

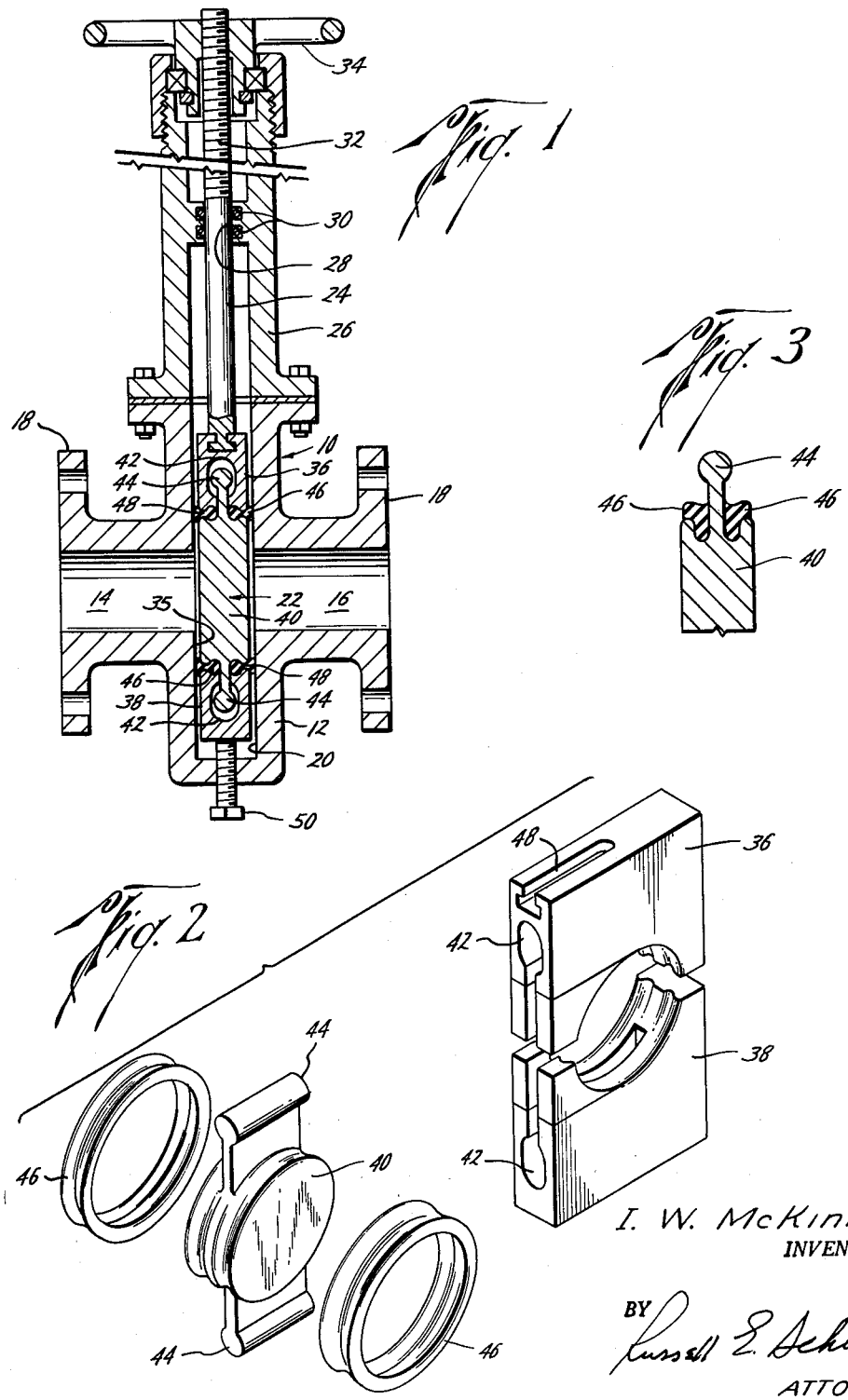

3,057,595
RESILIENT SEALED VALVE
I. W. McKinney, Houston, Tex., assignor to ACF Industries, Incorporated, New York, N.Y., a corporation of New Jersey
Filed Feb. 4, 1960, Ser. No. 6,807
1 Claim. (Cl. 251—187)

This invention relates to a reciprocating gate valve in which the valve member is provided with a plastic sealing member which in the closed position is pressured to form a seal around the flow passages.

The valve of the present invention has a body having aligned flow passages with a valve chamber interposed therebetween. A valve member is located in the valve chamber. The valve member is provided with plastic sealing members which in the closed position surround the flow passage. The valve member is so constructed that in the closed position pressure can be controllably exerted on the valve member to cause the plastic sealing members to flow and make sealing engagement with the wall of the body surrounding the flow passage thereby tightly sealing the valve. As a matter of definition, the term "plastic" as used in the specification and claims means a body of plastic material which flows under pressure with relatively great resistance to loss of internal bond between particles, and which acts in the manner of a fluid in the transmission of pressure. Included within such terminology are the natural or synthetic rubbers and various plastic elastomers which will perform such function.

The valve member has two end portions and a center section interlockingly connected together. There is an annular groove between the center section and end portions in which the plastic sealing member is positioned. The sealing member may be either a separate ring or may be integrally molded to the center section of the valve member. When the valve member is in the closed position, the sealing member forms an annular ring about the flow passage. Means are provided whereby the sealing member is controllably pressurized forcing the plastic material into intimate contact with the wall surrounding the flow passage to form a fluid tight seal. With the present construction, pressure is uniformly exerted on all parts of the sealing member. Upon release of the controlled pressure, the plastic material will relax; accordingly, easy movement of the valve to the open position results. The valve member is so designed that if the plastic material is lost, the groove for the sealing member will collapse and the gate member will act as a unitary metal valve member to form a metal-to-metal seal with the wall surrounding the downstream passage.

The above-described construction provides a valve having a seal which will hold, without the slightest leakage, against low pressure or up to any internal pressure for which the valve body is designed. The construction eliminates the need for ground metal seats and will function with full satisfaction even though the wall against which the plastic member seals has become scored or otherwise damaged. Having a sealing member on both sides of the valve member will permit flow from either direction and also will permit the valve to be used in block and bleed service.

It is an object of the present invention to provide a gate valve having a controllably pressurized plastic sealing member which can be economically manufactured.

It is another object to provide a gate valve in which an interlockingly connected valve member is provided with two plastic sealing members which seal against the walls of the valve member surrounding the flow passages.

It is still another object to provide a gate valve having an interlockingly connected three piece valve member provided with plastic sealing members.

It is a further object to provide a gate valve having an interlockingly connected valve member provided with plastic sealing members which are uniformly pressurized to provide a tight seal.

It is a further object to provide a gate valve having a primary plastic seal and which will, upon destruction of the plastic seal, perform as a metal-to-metal seal.

Other and further objects of the invention will be obvious upon an understanding of the illustrative embodiment about to be described, or will be indicated in the appended claim, and various advantages not referred to herein will occur to one skilled in the art upon employment of the invention in practice.

A preferred embodiment of the invention has been chosen for purpose of illustration and description and is shown in the accompanying drawings, forming a part of the specification, wherein:

FIG. 1 is a cross sectional view of a gate valve constructed in accordance with the present invention with the valve member in the closed position.

FIG. 2 is an exploded view of the valve member shown in FIG. 1.

FIG. 3 is a sectional view showing an alternate method of attaching the plastic material insert.

Referring now to the drawings, FIG. 1 shows an improved gate valve 10 incorporating the sealing means of the present invention. The gate valve 10 is comprised of a body 12 having aligned flow passages 14 and 16. The outer ends of the passages 14 and 16 are shown terminating in flanges 18—18 permitting the valve 10 to be connected to a flow system. Naturally, any other of the various well known means to finishing ends for connection to a flow system may be utilized.

The interior of the body is provided with a valve chamber 20 adapted to receive a movable valve member 22. A stem 24 is attached to the valve member 22 providing means to reciprocately move the valve member to the open or closed position. A bonnet 26 is attached to the top of the valve body closing the valve chamber 20. The bonnet 26 is provided with an opening 28 through which the stem 24 passes. O-rings 30, or other well known means of shaft packing, are used to establish a seal between the stem 24 and the wall of the opening 28. To provide reciprocatory motion to the valve member 22, the upper end of the stem 24 is provided with threads 32 which engage with the threads of a stem nut and handwheel 34. Rotation of the handwheel 34 results in reciprocatory movement of the valve member 22 as is well known in the art.

The valve chamber is provided with spaced-apart, opposed, parallel faces 35—35 surrounding the flow passages 14—16. One advantage of the present invention is that it is not necessary to provide machined seats and if the core for the body casting has a high grade finish such as obtained by the $CO_2$ or shell molding process, it is not necessary to do any machining to the interior of the body.

As can be seen in FIG. 2, the valve member 22 is comprised of end portions 36 and 38 and a center section 40. The center section 40 is generally circular and is provided with opposed flanges which terminate in knobular tongue portions. Each end portion is provided with a semicircular surface which faces the circular center section and an internal dovetail groove 42 which engages with the tongue 44 of the respective end portion interlockingly connecting the end portions 36—38 to the center section 40 to make a complete assembly. The assembly is so proportioned that between the end portions 36—38 and center section 40 there are annular grooves in which plastic material sealing members 46—46 are positioned. The plastic material sealing members 46—46 may be separate members interposed between the two sections or if desired they may be molded as part of the section 40 as shown in FIG. 3. If desired, the assembly may be molded as a unit with the plastic sealing members bonded to the circumferential walls of the grooves. It may be desirable in the relaxed position to have the plastic sealing members 46—46 extend slightly below the faces of the valve member 22 so that they will not offer resistance when the valve member is being moved from one position to the other. As previously mentioned, various rubbers, natural or synthetic, or plastic elastomers can be used to form the plastic sealing members—one particular material well adapted for the purpose is synthetic rubber such as "Hycar." It is desirable that the material be resilient so that when pressure is released the material will tend to return to its original shape. The assembly is so designed that the annular grooves formed between the end portions 36—38 and center section 40 have throats 48—48 to securely retain the plastic material sealing members 46—46 from dislodgement. The assembly is so proportioned that if the sealing members 46—46 should be destroyed, the grooves will be collapsed allowing the end portions 36—38 and center section 40 to contact whereby valve member 22 will act as a unitary metal gate member forming a metal-to-metal seat with the surface 35 surrounding the downstream passage 16. The top section 36 is provided with a T-slot 48 which receives the T-head of the stem 24.

In operation the valve member 22 is moved by rotation of the handwheel 32. To close the valve, the valve member is moved into the valve chamber until it contacts an adjustable stop 50 which is positioned in the bottom of the valve chamber 20. Once the section 38 of the valve member has contacted the stop 50, further movement of section 38 of the valve member is restrained. Continued rotation of the handwheel 32 causes the end portion 36 to continue its movement. Since further movement of end portion 38 is arrested by the stop 50, the continued movement of end portion 36 exerts a pressure on the plastic sealing members 46—46. Having the rigid center section 40 causes this pressure to be uniformly exerted over the entire circumferential surfaces of the sealing members 46—46 which results in the plastic material flowing out of the throats 48—48 and into intimate sealing contact with the faces 35—35 of the valve chamber surrounding the passages 14—16 as shown in FIG. 2. Inasmuch as the circumferential surfaces of the sealing members 46—46 are completely encircled by the parts of the valve member, there will be a uniform pressurization of the plastic material. The plastic material forming the sealing member will flow against the face of the wall and into slight irregularities of the wall providing a tight seal around the passageway. If the valve does develop a slight leak, slight rotation of the handwheel will increase the pressure on the plastic sealing member forcing it into more intimate contact with the faces 35—35 thereby stopping the leakage. The plastic sealing members 46—46 completely encircles the upstream and downstream flow passages. Having seals on both sides of the valve member 32 assures an upstream seal at all times regardless of the direction of flow thereby permitting the valve to be used in block and bleed service. To open the valve, the handwheel is rotated in the opposite direction. The first rotation of the handwheel relieves the pressure on the plastic sealing members and permits them to retract from the faces 35—35 and return to their original shape preventing any extra drag from the seals. In the event that the plastic sealing members should be destroyed by corrosive action of the lading in the valve or by extreme heat, the valve member 22 is so proportioned that by rotating the handwheel 34 sufficiently the grooves for the plastic sealing members will be collapsed establishing in effect a unitary metal valve member which will seal against the downstream side of the valve.

As can be seen, the valve member of the present invention is so designed that a fluid tight seal will be provided against all conditions of flow and in normal operation will not depend upon flow to seal the valve. This fluid tight seal can be obtained from extremely low pressures, which are difficult to seal against, up to any pressure for which the valve body is designed. By using the controlled pressure method of sealing and the plastic seal, a fluid tight seal can be obtained even though the sealing surface surrounding the flow passages has become scored or otherwise damaged since the plastic material will flow into such scratches and take care of any minor irregularities.

From the foregoing, it will be seen that the valve is one well adapted to attain all of the ends and objects herein above set forth, together with other advantages which are obvious and which are adherent to the valve described.

As various changes may be made in the form, construction and arrangements of the parts herein without departing from the spirit and scope of the invention and without sacrificing any of its advantages, it is to be understood that all matter herein is to be interpreted as illustrative and not in a limiting sense.

I claim:

A valve comprising a body having aligned flow passages, a valve chamber interposed therebetween, the chamber having spaced-apart, opposed, parallel faces surrounding the flow passages, a valve member located in the valve chamber movable between valve open and valve closed position, the valve member comprised of two end portions, a center section and plastic sealing members, the center section being generally circular and provided with opposed flanges terminating in knobular tongue portions, each end portion having a semi-circular surface facing the circular center section and an internal dovetail groove receiving the tongue portion of the center section thereby loosely interlockingly connecting the end portions to the center section whereby the circular center section fits loosely between the semi-circular surfaces of each of the end portions, annular grooves formed between the end portions and center section in which are located the plastic sealing members, the edges of the grooves forming throats to prevent dislodgement of the plastic sealing members, a reciprocatory stem attached to one of the end portions to reciprocately move the valve member, a stop for the valve member in the closed position whereby further movement of the valve member energizes the plastic sealing members forcing them into intimate sealing contact with the opposed faces of the valve chamber surrounding the flow passages, the assembly so proportioned that upon loss of the sealing members the annular grooves will collapse to permit the valve member to become a unitary member.

References Cited in the file of this patent

UNITED STATES PATENTS

| | | |
|---|---|---|
| 2,401,377 | Smith | June 4, 1946 |
| 2,911,188 | Anderson | Nov. 3, 1959 |